US009525651B2

(12) United States Patent
Gonen et al.

(10) Patent No.: US 9,525,651 B2
(45) Date of Patent: Dec. 20, 2016

(54) METHOD AND SYSTEM FOR IMPROVING ESTABLISHING OF A MULTIMEDIA SESSION

(71) Applicant: Polycom, Inc., San Jose, CA (US)

(72) Inventors: Edward Gonen, Yoqneam Illit (IL); Guil Yedlin, Kiriat Tivon (IL); Anupam Sahai, Cupertino, CA (US); Shai Toren, Moshav Alonei Aba (IL); Boris Rakhlin, Haifa (IL)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/549,850

(22) Filed: Nov. 21, 2014

(65) Prior Publication Data

US 2015/0081822 A1  Mar. 19, 2015

Related U.S. Application Data

(62) Division of application No. 10/941,790, filed on Sep. 15, 2004, now Pat. No. 8,924,464.

(Continued)

(51) Int. Cl.
*G06F 15/16* (2006.01)
*H04L 12/58* (2006.01)
(Continued)

(52) U.S. Cl.
CPC ......... *H04L 51/046* (2013.01); *H04L 12/1818* (2013.01); *H04L 29/06027* (2013.01); *H04L 65/403* (2013.01); *H04L 65/4038* (2013.01)

(58) Field of Classification Search
CPC ............... H04L 51/046; H04L 12/1818; H04L 29/06027; H04L 65/403; H04L 65/4038
See application file for complete search history.

(56) References Cited

U.S. PATENT DOCUMENTS 5,222,120 A * 6/1993 McLeod ................. H04M 3/42
379/196
5,617,539 A * 4/1997 Ludwig et al. ............... 709/205
(Continued)

FOREIGN PATENT DOCUMENTS

EP   1294165     3/2003
WO  00/04693    1/2000
WO  01/65390    9/2001

OTHER PUBLICATIONS

European Search Report received in European Application No. EP04022350 dated Mar. 30, 2006.
(Continued)

Primary Examiner — Jonathan Bui
(74) Attorney, Agent, or Firm — Blank Rome, LLP

(57) ABSTRACT

Multimedia communication systems and methods are disclosed. An exemplary system comprises a server adapted to communicate with two or more multimedia endpoints; and a MCU adapted to communicate with the at least one server and the multimedia endpoints, wherein the server contains a module for instructing the multimedia endpoints to call a dial number for the MCU to establish a multimedia conference in response to a requested list of multimedia endpoints received from one of the multimedia endpoints. An exemplary method for establishing a multimedia conference comprises receiving at a server from a first endpoint a requested list of second endpoints desired to participate in the multimedia session; reviewing at the server the status of the second endpoints; and if the status of a particular second endpoint is an available status, instructing at least some of the available second endpoints to call a dial number for a MCU to participate in the multimedia conference. A further exemplary method allows for a determination to be made whether a multipoint or point-to-point conference is (Continued)

required, and allows a user to leave a message for users who unavailable to participate in the conference.

15 Claims, 8 Drawing Sheets

Related U.S. Application Data

(60) Provisional application No. 60/503,968, filed on Sep. 19, 2003.

(51) Int. Cl.
*H04L 12/18* (2006.01)
*H04L 29/06* (2006.01)

(56) References Cited

U.S. PATENT DOCUMENTS

| | | | |
|---|---|---|---|
| 5,737,010 A | 4/1998 | Yachi et al. | |
| 6,167,253 A * | 12/2000 | Farris | H04M 11/08 455/412.2 |
| 6,335,927 B1 * | 1/2002 | Elliott | H04L 12/14 370/352 |
| 6,690,672 B1 * | 2/2004 | Klein | 370/401 |
| 7,085,243 B2 | 8/2006 | Decker et al. | |
| 7,180,889 B1 * | 2/2007 | Kung et al. | 370/352 |
| 7,301,661 B2 * | 11/2007 | Sagiya | H04N 1/32074 358/1.15 |
| 7,353,251 B1 | 4/2008 | Balakrishnan | |
| 7,987,233 B1 * | 7/2011 | Osborne | H04N 7/15 709/206 |
| 2002/0136366 A1 * | 9/2002 | Contractor | 379/67.1 |
| 2002/0159394 A1 | 10/2002 | Decker et al. | |
| 2002/0159572 A1 * | 10/2002 | Fostick | 379/88.14 |
| 2003/0053612 A1 * | 3/2003 | Henrikson et al. | 379/202.01 |
| 2003/0115203 A1 * | 6/2003 | Brown | G06F 17/30867 |
| 2003/0145247 A1 | 7/2003 | Matthews et al. | |
| 2003/0153343 A1 | 8/2003 | Crockett et al. | |
| 2003/0154249 A1 | 8/2003 | Crockett et al. | |
| 2003/0158900 A1 | 8/2003 | Santos | |
| 2003/0167176 A1 * | 9/2003 | Knudson | H04N 7/186 709/204 |
| 2004/0001446 A1 | 1/2004 | Bhatia et al. | |
| 2004/0022237 A1 | 2/2004 | Elliott et al. | |
| 2004/0030750 A1 | 2/2004 | Moore et al. | |
| 2004/0032485 A1 | 2/2004 | Stephens | |
| 2004/0047342 A1 | 3/2004 | Gavish et al. | |
| 2004/0117218 A1 | 6/2004 | Friedrich et al. | |
| 2004/0165710 A1 | 8/2004 | DelHoyo et al. | |
| 2004/0190498 A1 | 9/2004 | Kallio et al. | |
| 2004/0203677 A1 | 10/2004 | Brown et al. | |
| 2004/0249884 A1 | 12/2004 | Caspi et al. | |
| 2004/0267884 A1 * | 12/2004 | Sar-Shalom | 709/206 |
| 2005/0018828 A1 | 1/2005 | Nierhaus et al. | |
| 2005/0018849 A1 | 1/2005 | Rodriguez et al. | |
| 2005/0020288 A1 * | 1/2005 | Davis et al. | 455/466 |
| 2005/0053230 A1 * | 3/2005 | Gierachf | 379/406.06 |
| 2008/0025295 A1 | 1/2008 | Elliott et al. | |
| 2010/0226287 A1 | 9/2010 | Horvath et al. | |

OTHER PUBLICATIONS

European Search Report received in European Divisional Application No. EP10006695 dated Aug. 23, 2010.

* cited by examiner

METHOD AND SYSTEM FOR IMPROVING ESTABLISHING OF A MULTIMEDIA SESSION

CROSS REFERENCE TO RELATED CASES

This application is a divisional of U.S. patent application Ser. No. 10/941,790, filed Sep. 15, 2004, which claims the benefit of U.S. Provisional Patent Application Ser. No. 60/503,968, filed Sep. 19, 2003, both of which are incorporated herein by reference, and to which priority is hereby claimed.

FIELD OF THE INVENTION

This invention relates generally to the field of multimedia communication, and more particularly to providing an efficient and easy way for establishing an impromptu multimedia communication session or conference.

BACKGROUND

As the geographical domain in which companies conduct business continues to expand, multimedia conferencing technology attempts to bring the world closer together. However, as with most user-based technologies, the user interface for establishing and controlling a multimedia conference does not provide a convenient way to spontaneously establish such a conference between endpoints. Thus, generally, a multimedia conference is scheduled in advance by a conference moderator, who must establish or receive a dial-in number, an IP address, and/or a URL for the conference, and distribute this information in advance to the various conference participants as well as the time of the conference. The participants may then dial in to the conference at the appropriate time.

A multimedia endpoint is a terminal on a network capable of providing real-time one way or two way audio and/or visual communication and/or data with other terminals or with a control unit. When more than two endpoints participate in a conference, a Multipoint Control Unit (MCU) is used to connect the conferees together. An MCU is a conference controlling device typically located in a node of the network or in a terminal which receives several logical or physical channels from access ports, and which in accordance with certain criteria processes audiovisual and data signals and distributes them to the connected channels. Examples of MCUs include the MGC-100, which is available from Polycom, Inc. Other exemplary MCUs can be software MCUs such as, but not limited to, OPENMCU described at www.openh323.org, which is incorporated by reference herein. An MCU may control audio conferences, audio/video conferences, audio and data conferences, audio/video/data conferences, etc.

There are occasions when a user (or peer or conferee or participant) may communicate with another user using conventional means such as a telephone (audio) or by instant messages (text chat) over an IP-based network. Later, these users may wish to upgrade such means of communication, for example, by adding one or more users or by adding multimedia to their communication. However, such an upgrade is complicated for the reasons set forth above, as generally many aspects of the upgraded conference would need to set up in advance. In short, the difficulty of establishing an impromptu multimedia communication prevents users from adding multimedia capabilities and or/additional users to their conference session.

Thus, it is evident that current technologies make establishing an impromptu multimedia communication difficult, which hampers the utility of such communications. Therefore, there is a need in the art for new methods and systems to allow impromptu multimedia conferences to be established simply and easily.

SUMMARY

The present invention solves the above-described needs by offering new methods and systems for managing the establishment of a multimedia communication among two or more users. The system may comprise a managing module (MM) that is added to a IP server (IPSR), such as a Polycom Web Office server sold by Polycom, Inc. However, the present invention is not limited to such a server, and other exemplary embodiments of a managing module may be installed in other IP servers offering data communications and/or data conferencing over an Internet Protocol (IP) network for example.

The MM communicates with the users of the system and with one or more MCUs, preferably using an IP network or any other type of network connection. Communication with the users is accomplished through a "client agent" resident on the users' computers. The client agent communicates with the user's multimedia endpoints and reports the status (on, off, etc.) of the endpoints to the MM. The MMs may send indications and instructions to the users by sending instant messages, and may communicate with the MCUs via an XML, HTML API, or any other communication means that is installed in and understood by the MCUs.

The MM may include a database containing a plurality of "buddy lists." Each user may have one or more buddy lists, and each corporation may have one or more common buddy lists that may be accessed by authorized users. Each entry in the buddy list may comprise, among other information, the following fields: user name; multimedia endpoints and the capabilities of each; dialing numbers for the multimedia endpoints; the current status of the endpoints (e.g., on, off, busy); the current status of the user (e.g., away, available, unavailable etc.). A user may define his status to be seen differently by different buddies.

When a user of the system wishes to establish a multimedia communication with one or more users (herein referred to as the conference's "moderator"), the moderator calls the appropriate buddy list from the MM, thereby generating a requested list. The moderator may then push a button that instructs the MM to establish a multimedia session. From this point, the communication responsibilities for the conference are transferred to the MM at the IPSR. Based on parameters such as the number of endpoints that are involved in the session, the type of the endpoints, the endpoint capacities, the availability of MCUs, the network topology, etc. the MM decides on the best way to connect the buddies (point-to-point, MCU, bit rate, etc.).

The MM checks the status of the endpoints of each one of the users in the requested list. If the multimedia endpoint for a given user in the requested list is off-line or busy, then the MM may send a message (e.g., an instant message) to that user informing him that the moderator is attempting to contact him and requesting him to activate his device. In parallel, a message may be sent to the user's computer to inform him of the same. Thereafter the MM continues to query the next user in the requested list.

If a given user's endpoint is on-line, then the MM sends a request to the MCU to establish a connection between the moderator and that user, and/or to add that user to a conference that has been already established. The request to the MCU may include the communication parameters of the moderator, which may include his dialing number or IP address; the type of his/her multimedia endpoint; the endpoint's capabilities, etc. Then the MM may move to the next user in the requested list. After the last user in the requested list is reached, the MM may wait for a certain period and return to the beginning of the list checking the current status of users that were off-line or busy during the previous cycles. The MM may repeat this loop several times or may continue until all the users in the requested list are connected. In an alternate embodiment, the moderator may be transferred to a multimedia answering system in order to leave a multimedia message for the unavailable peer. At the end of each loop, the MM may send an indication to the moderator regarding the current status of each one of the users in the requested list.

In other exemplary embodiments, the disclosed systems and methods monitor the status of the multimedia session to attempt to correct undesirable situations. For example, if an MCU fails, an alternative substitute MCU may be searched for; or, if a user is disconnected, the system may try to connect him again by informing the MCU to dial a "dial out" that is associated with that user or requesting the client agent at the user's computer to instruct the user's endpoint to call a "dial in" that is associated with the multimedia session.

In yet another embodiment, a user in the buddy list may have more than one endpoint associated with a user. In such a case, if the first endpoint is not responding to the connection, the MM may try to reach the unavailable user via other endpoint in the list.

Other objects, features, and advantages of the present invention will become apparent upon reading the following detailed description of the embodiments along with the accompanying drawings and appended claims.

DETAILED DESCRIPTION

Figure 1:
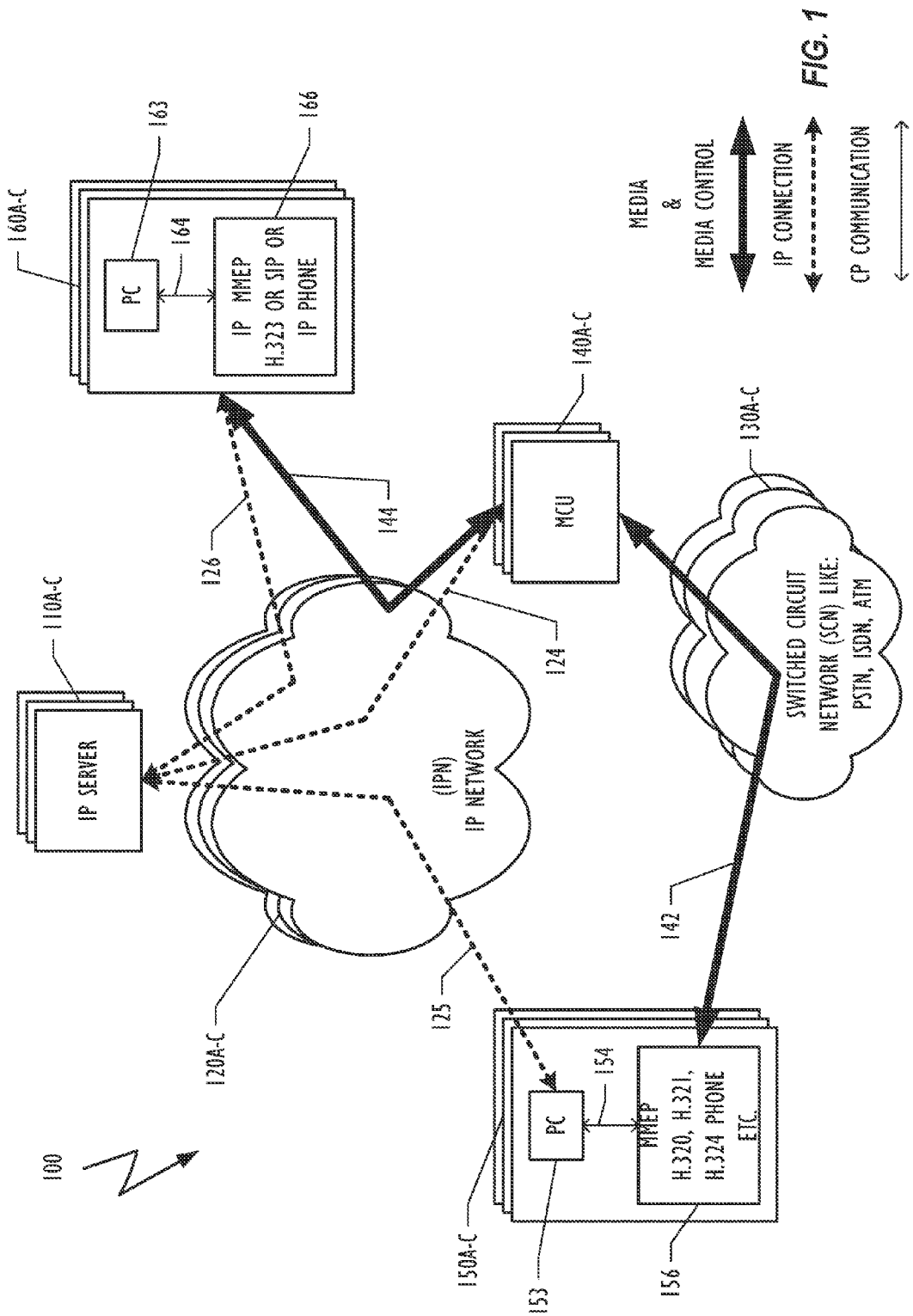
FIG. 1 is a block diagram illustrating the topology of an exemplary audio and/or multimedia conferencing system using an exemplary embodiment of the disclosed systems and methods.

FIG. 1 is a block diagram illustrating the topology of an exemplary audio and/or multimedia conferencing system 100 that uses an exemplary embodiment of the present invention. The system 100 includes one or more IP Servers 110a-c; a plurality of users 160a-c; a plurality of users 150a-c; one or more Switched Circuit Networks (SCNs) 130a-c; and one or more Multipoint Control Units (MCUs) 140a-c. Each user 160 may have a multimedia endpoint (MMEP) or an IP phone 166 capable of multimedia conferencing over an IP network, and/or an associated PC 163 having an IP connection 126 over IP network (IPN) 120 and/or IP cellular phone, or cellular PDA. Each user 150 likewise may have a multimedia endpoint (MMEP) or a phone (e.g., analog, digital or cellular) 156 capable of multimedia conferencing over Switched Circuit Network (SCN) 130a-c, and/or an associated PC 153 having an IP connection 125 over IPN 120. Although three units of each item are shown for convenience of presentation, there may be fewer or more than three of each item in an actual conferencing system. Also, there is no requirement that the number of each item be the same as the number of any other item.

In general and as just noted, there are two types of users in the exemplary embodiment of FIG. 1: users 150a-c and 160a-c. The two types of users differ from each other by the type of their multimedia endpoint and by the network that carries real-time communications to or from the user. User 150 may have an audio/multimedia endpoint 156a-c that is connected over connection line 142 to a SCN 130a-c, which may be a PSTN, ISDN, an ATM network, or combination of those. Audio/multimedia endpoint/terminal 156a-c may provide speech only (e.g., analog telephone), speech and data, speech and video, or speech, data and video. Real-time communication over SCN 130a-c may be based on International Telecommunication Union ("ITU") standards, such as but not limited to H.320, H.321, and H.324, which standards are hereby incorporated by reference. SCN 130a-c may comprise gateways (not shown in the drawings) for facilitating communication between different networks.

Each users 150a-c may also have a computer 153, such as a personal computer, a laptop, a palm computer (PDA), a notebook, cellular phone, a cellular PDA, or any other like programmable device capable of similar operation (collectively referred to for simplicity as a "PC"). PCs 153 may be part of the multimedia endpoint 156 or may be separate. PCs 153 may be connected via connection 125 over an Internet Protocol (IP) based network 120, and may communicate over an Intranet with users in the organization or over the Internet with others uses as well as with IP Servers 110a-c. PCs 153 may also communicate with multimedia endpoint 156 over connection 154, which may be a common connection such as serial connection RS232 connection, a wireless connection based on Bluetooth protocol, an Infra Red (IR) connection, an IP connection over a LAN or the Internet, etc. In alternate embodiments a user's PC 153 may also act as an IP server 110a-c.

Users 160 may have a multimedia endpoint 166 that is connected over IP connection 144 to an IPN 120, which may comprise the Internet, an intranet, a LAN, or a similar network, or combinations of these. The endpoints 166 can vary in their connectivity. For example, some of the endpoints 166 may be connected directly to the Internet, while others may be connected to the Internet through a corporate intranet complete with routers, firewalls, etc. Multimedia endpoint 166 may provide speech only (e.g. IP Phone), speech and data, speech and video, or speech, data and video. Real-time communication over IPN 120 may be based on International Telecommunication Union ("ITU") standards (e.g., H.323), or the Internet Engineering Task Force's Session Initiation Protocol (SIP) standard. More information about the SIP standard may be found at the website http://www.IETF.org, and this standard is incorporated herein by reference. Although not shown, IPN 120 may comprise gateways, gatekeepers, soft switches and other network devices.

Like users 150a-c, users 160a-c may also have a PC 163, which may be part of the endpoint 166 or separate therefrom. PCs 163, and there connection 164 to the endpoints 166, are similar to PCs 153/connections 154 described above.

Among other tasks and applications, PCs 153 and 163 preferably run a client agent software program. The client agent interfaces with the users, with the multimedia endpoints 156 or 166 via connections 154 or 164 respectively, and with the MMs that are installed in the IP server 110a-c via IP connections 125 or 126 respectively. A detail description of the client agent and its operation is disclosed below with respect to FIGS. 2, 4, and 7.

In alternate embodiment (not shown in the drawing), in which endpoints 156/166 may be controlled via an IP network, connections 154/164 may be IP connections over an Intranet or over the Internet. In such an embodiment, the client agent may be divided into two segments. The first segment may reside in the IP server 110a-c and is used for interfacing with the endpoints 156/166, and may control and/or collect statuses from the endpoints. The other segment may reside in the users' PCs 153/163 and is used for interfacing with the users as well as for managing the private buddy lists of the user. In such a configuration, endpoints 156/166 may be associated with one or more users.

In another embodiment, the connection 154/164 between the PCs 153/163 and endpoints 156/166 is flexible and may be changed by the user according to his current needs. Such an embodiment may be used in systems in which the connection 154/164 comprises an IP connection over a LAN or a wireless connection as mentioned earlier. Each endpoint 156/166 can have an ID number, and a user may configure the connection 154/164 using that ID number, which is then sent to the IP server 110a-c as an update.

IP Servers (IPSR) 110a-c, among other tasks and applications, may run a software program, which is referred as Managing Module (MM). The MM manages the establishment of one or more multimedia sessions between two or more of users 150a-c and/or 160a-c. IPSRs 110a-c may be installed, for example, in an Intranet of a corporation, or may be installed in a multimedia operator's premises, close to MCUs 140a-c. In the latter case, the IPSRs 110a-c and the MCUs 140a-c may be connected over a LAN and may use a load balancer for distributing the load among them. The IPSR 110a-c may also communicate with the MCUs 140a-c via RS232 protocols, SCSI protocols, wireless protocols, etc., or the IPSRs may constitute a portion of the MCUs.

The MM preferably manages a user database and contains the update status of each one of the endpoints 156/166 as well as their connection parameters and capabilities. Such connection parameters may include the 'dial in' number and/or IP address for the endpoints 156/166, minimal connectivity speed, maximal connectivity speed, type of communication standards that can be supported by the endpoint, etc.

The MM preferably also receives, via the client agent at the PCs 153/163, and the IP connections 125/126, a request to establish a multimedia session, which in turn causes the MM to begin a request handle task. The request handle task may be implemented in different ways. In the case of a point-to-point session between two users only, the MM at the appropriate IPSR 110a-c may send the connection parameters of called user to the requesting client agent at the appropriate PC 153/163, and can instruct the requesting client agent to communicate the instruction with the connection parameters to its associated endpoint 156/166 to enable communication with the called endpoint 156/166.

In the case of a multipoint session between three or more users, the MM at the appropriate IPSR 110a-c may request one or more MCUs 140a-c to initiate a multimedia session. There are some cases in which an MCU may be selected to set a session between two endpoints. For example, an audio session between two peers that also requires data may need an MCU; also an MCU or gateway may be used when a point-to-point connection fails, or when transcoding is required, etc. In any event, the MM preferably sends the connection parameters of "dial out" users (i.e., user that the MCU calls to establish a multimedia session) to the appropriate MCU 140a-c. The MM preferably also sends the connection parameters of the appropriate MCU 140a-c to the client agent at the PCs 153/163 of the "dial in" users (i.e., users who call the MCU to establish a multimedia session), and requests the client agent to instruct such dial-in endpoints 156/166 to call the MCU. The "dial out" option may be used to add a user (e.g., 150a-c) who does not have a PC (e.g., 153). A detailed description of the MM and its operation is disclosed below with respect to FIGS. 3, 5, 6 and 7.

MCUs 140a-c may be common MCUs that conduct audio and or multimedia multipoint communication. Among other ways of receiving requests to establish a multimedia session between two or more endpoints, MCU 140a-c may receive a request from IPSR 110a-c via IP connection 124 or any other type of connection. The request preferably carries the required information to establish the session, such as the dial-in number and/or IP address of the appropriate endpoints 156 or 166, their connection parameters, identification information, etc. The request may be based on HTML or XML protocol and may be processed by an appropriate Application Program Interface (API) at the MCU.

Figure 2:
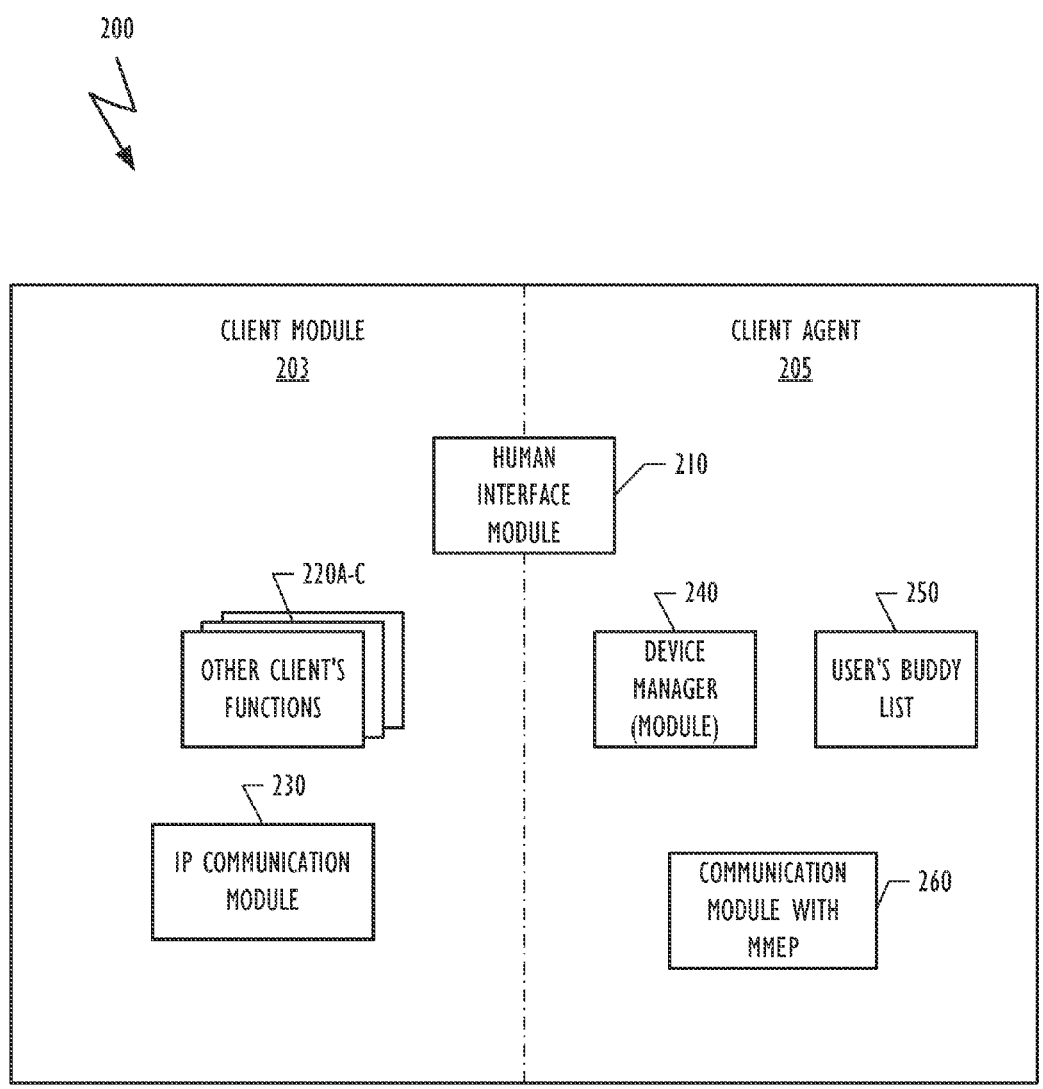
FIG. 2 is a block diagram of exemplary software modules of a client computer.

FIG. 2 shows a block diagram of exemplary software modules in a client computer 200. Client computer 200 preferably comprises, among other software modules, two main modules: a client module 203 and a client agent 205. An exemplary client module 203 comprises the following modules: a Human Interface Module (HIM) 210; one or more Other Client Functionality Modules (OCFM) 220a-c; and a IP Communication Module (IPCM) 230. An exemplary client agent 205 comprises a Device Manager Module (DMM) 240; a User Buddy List Module (UBLM) 250; and a Communication Module (CM) 260.

The HIM 210 is the interface between the user and the rest of the modules of the client computer 200. HIM 210 may have a graphical user interface that interacts with the user by creating and displaying graphical information and soft keys on the display of the users' PCs 153/163. HIM 210 may also use Interactive Voice Response (IVR) messages or any other common method that is used for human-machine interaction.

OCFM 220a-c comprises an application module that supports other applications (e.g., Microsoft Office, etc.) or other services that may be provided by IP server 110a-c. An exemplary OCFM 220a-c may include a data collaboration module, which may be used if the IP server 110a-c is used as a server for handling data conferences.

IP Communication Module 230 communicates between the client agent 205 and the IP server 110a-c, for example, using an IP connection. Over the IP connection, IPCM 230 may send the status of the endpoint 156/166 that is associated with the users' PCs 153/163. Such status is determined either by the DMM 240, user requests received via HIM 210, and data or commands sent from the MM to the different modules of client agent 205. One important feature of the IPCM 230 is to send indication to the IPSR 110a-c whether client agent 205 is on-line and active.

DMM 240 preferably communicates with its associated endpoint 156/166 via communication module 260, and from time to time may check whether the endpoint is on or not. DMM 240 may instruct the endpoint 156/166 to dial another endpoint's number for a point-to-point session, or to dial an MCU 140a-c's number for multipoint session. The instruction may include the required set up of the endpoint as discussed earlier. More information concerning operation of DMM 240 is disclosed below with respect to FIGS. 4 and 7. In case that the endpoint 156/166 cannot be externally controlled, the DMM 240 preferably requests the user via the HIM 210 to set the endpoint accordingly.

User Buddy List Module (UBLM) 250 preferably manages a private list normally resident on the PC 153/163 where the client agent 205 resides. Such lists may created by collecting selected entries of potential users from a main user database that resides in the IPSR 110a-c. Upon receiving a request to establish a multimedia session, UBLM 250 may display a list of the groups to be selected by the user, and/or a list of the "buddies" (users) in the group. Each entry in the list may have, among other parameters, the name of the buddy, the type of each buddy's endpoint 156/166, and the current status of those endpoints. Upon selecting a buddy list, a sub list is generated and is send to the MM in the IPSR 110a-c for further processing.

Communication Module (CM) 260 is the interface between DMM 240 and its associated endpoint 156/166, and communicates with the endpoints via connections 154/164. An appropriate communication protocol is selected on the basis of the type of connection 154/164 being used (RS232, Bluetooth, etc.). During the installation of client agent 205, DMM 240 and CM 260 may be configured to suitably function with their associated endpoints 156/166 and/or connections 154/164.

In alternate embodiments in which a segment of the client agent 205 resides in the IP server 110a-c, the DMMs 240 and/or CMs 260 may reside in whole or in part in a client agent section in the IP servers.

The client agent 205 may be invoked while using other applications. For example, a user currently using a Microsoft Word application and desiring to establish a multimedia session may invoke the client agent 205 by selecting a certain function in that application, for example, from within the "Tools" menu of Microsoft Word. In this example, the client agent 205 may constitute a "plug in" to the Microsoft Word application. Of course, the client agent 205 may include its own Application Program Interface (API) separate from any other hosting application.

In an alternate embodiment, the hosting program constitutes a scheduling software application, such a Microsoft Outlook, for example. A plug in module may be added to the scheduling application, which offers an additional key to a user to select a multimedia session with one or more users. After setting the meeting, the plug in module may transfer the information about the multimedia session of the meeting to the client agent, for example, by storing a file concerning the multimedia session to a shared location. The client agent 205 is programmable to cyclically read the shared location every few minutes, for example. If the client agent 205 finds new information in the shared location, it checks whether the multimedia session is to be established now. If so, the client agent 205 creates a requesting list based on the list of names in the stored file. The requesting list is then sent to the server 110a-c (FIG. 1) as disclosed below with respect to FIGS. 7a and 7b (see, e.g., steps 732 and step 740). If the multimedia session is scheduled for the future, the information may be stored in a reservation queue to be retrieved and processed at the appropriate time.

Figure 3:
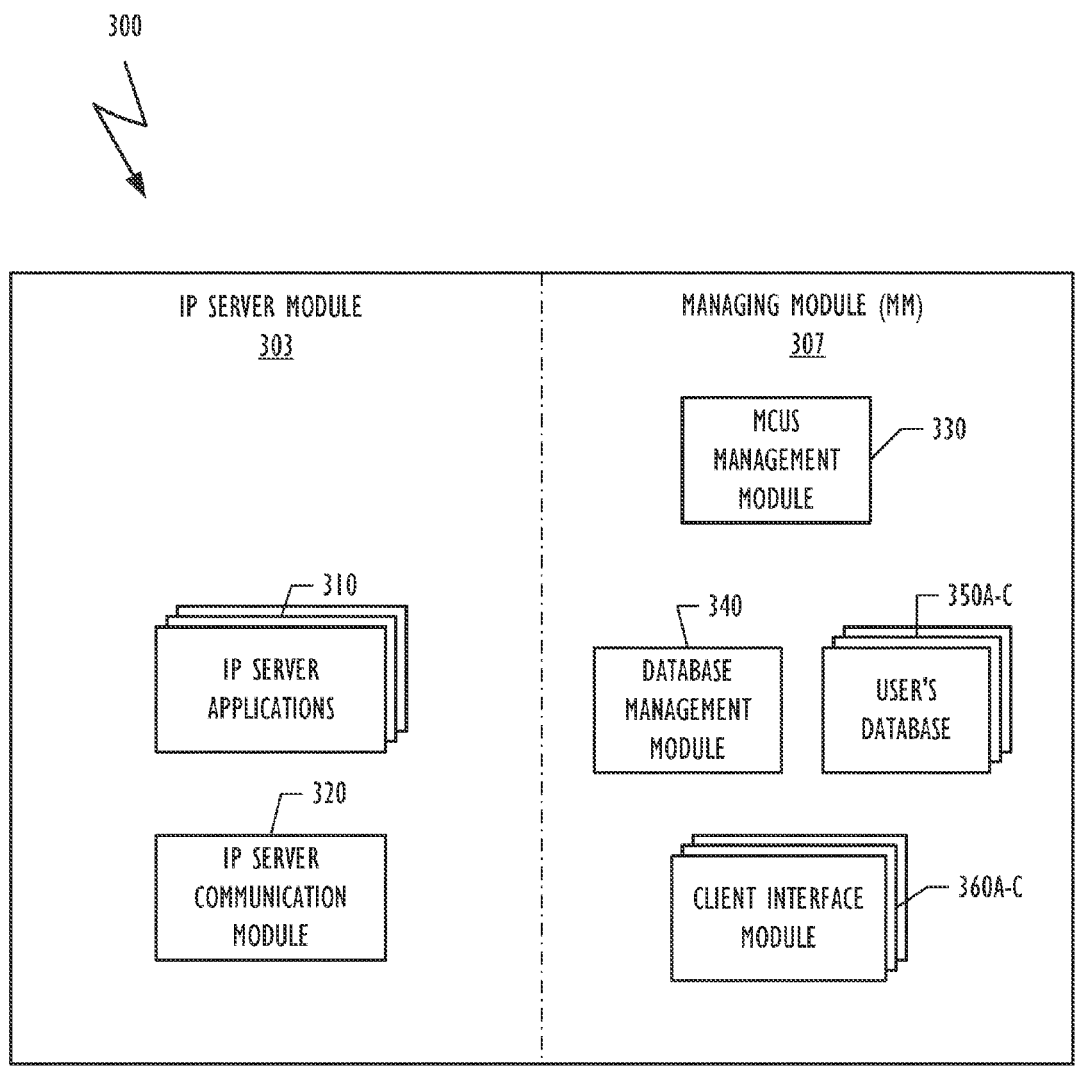
FIG. 3 is a block diagram of an exemplary embodiment of modules in an IP server.

An exemplary embodiment of an IP sever 110 is shown in FIG. 3. The exemplary IP server 110 preferably comprises two main modules: an IP server module (IPSM) 303 and managing module MM 307. The IPSM 303 preferably comprises different IP server applications 310 and communication modules 230. An exemplary IP server application 310 can comprise the Polycom WebOffice server discussed earlier. The disclosed methods may be embodied in other types of IP servers 110 such a Microsoft IIS. Moreover, the IP server 110 may be resident at the premises of a multimedia service provider premises and dedicated solely for use with multimedia conferences. In such an exemplary embodiment, IP server 110 may not require the IPSM 303.

MM 307 preferably comprises an MCU management Module (MCUM) 330; a database management module (DBMM) 340; one or more user databases (UDB) 350a-c; and one or more client interface modules (CIM) 360a-c for each served client.

The MCUM 330 manages a database of connection parameters and available resources for one or more MCUs 140a-c associated with the IP server 110. The connection parameters may be the type of supported networks (ISDN, PSTN, IP etc.), bit rates, IP addresses or dialing number, communication standards (H.320; H.324; SIP; H.323 etc.), etc.

MCUM 330 preferably receive a list of users with a request to connect them in a multimedia session. The list may be sent from the client agent 205 in the PC of the moderator who requested the multimedia session. MCUM 330 may request DBMM 340 to retrieve the information of those users from the appropriate UDB 350a-c. Then MCUM 330 may decide whether the request is for a point-to-point session, a gateway session, or a multipoint session. The decision is based on the connection parameters of the users and the number of the users that are in the list.

If a multipoint session is necessary, MCUM 330 selects an appropriate MCU 140a-c and sends the parameters of the conference to that MCU, including the list of the users the MCU must call and their connection parameters. In parallel, MCUM 330 may transfer to the appropriate CIM 360a-c the parameters of the selected MCU 140a-c as well as the list of the users that have to dial in to the MCU to join the conference. CIM 360a-c may send this information to the client agent 205 in the user's PC and to instruct the client agent to call the MCU.

If the session is point-to-point session or a gateway session, MCUM 330 sends (via the appropriate CIM 360a-c) to the client agent 205 at the moderator's PC the connection parameters of the other user or gateway being contacted. The MCUM 330 then preferably requests the client agent 205 to instruct the endpoint of the moderator to call the endpoint of the other user or the gateway. More information concerning the operation of MCUM 330 is discussed below in conjunction with FIGS. 5, 6 and 7.

UDB 350a-c preferably comprises a database containing information about the users that may be served by IP server 110. UDB 350a-c may be divided into groups, which each group being associated with a particular corporation for example. Each group may be further subdivided into corporate subgroups, etc., and/or the UDB 350a-c may contain private sections for individual users. Access to each group, subgroup or private section may be limited to authorized users. Each entry in UDB 350a-c preferably contains, among other parameters, the name of a buddy; the type of the buddy's endpoint 156/166; the current status and connection parameters of those endpoints; etc. UDB 350a-c is preferably managed by DBMM 340. UDB 350a-c may import information from other databases. For example, the database group for a corporation may comprise the user list provided by the corporation's Microsoft Outlook application listing its various employees.

Figure 6:
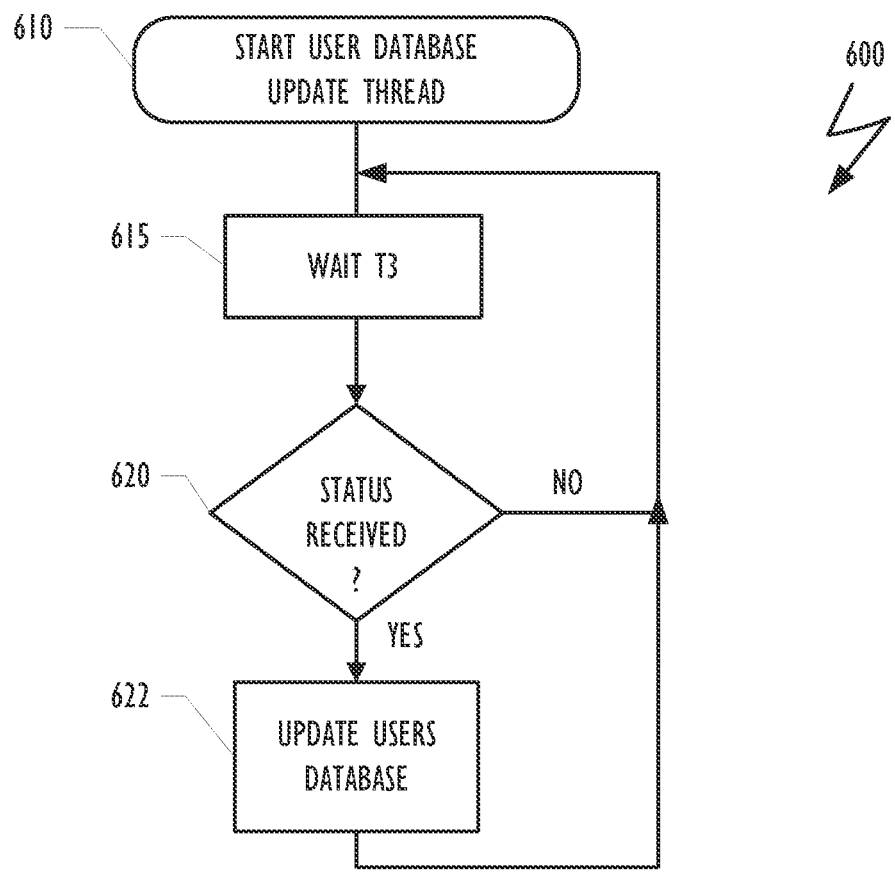
FIG. 6 illustrates a flowchart of an exemplary user database update task that may be used by an exemplary IP Server.

From time to time, DBMM 340 preferably request an update of the status of the users' endpoint 156/166. The request may be sent via CIM 360 to the appropriate client agent 205 at the user's PC 153/163. Upon receiving their responses, DBMM 340 may update their entries in UDB 350a-c. In alternate embodiment, as illustrated in FIG. 6, DBMM 340 may be passive and wait until receiving a status update from a user. Then DBMM 340 may update the entry of that user in the user's database 350a-c.

DBMM 340 may receive a request to send a list of user's names from a certain group, sub-group or private section, of UDB 350a-c. After verifying the authorization of the request, DBMM 340 send the requested list via CIM 360a-c to the appropriate client agent 205. DBMM 340 may also receive requests from MCUM 330 to provide connection information for certain sets of users, to which the DBMM 340 responds by retrieving the appropriate information from UDB 350a-c. More information on the operation of MM 307 is discussed below with respect to FIGS. 5, 6 and 7.

In alternate embodiments, in which segments of the client agent 205 resides at the IP server 110a-c, MM 307 may comprise one or more DMMs 240 and/or CMs 260 to directly communicate with and control one or more endpoints 156/166 over an IP network or other suitable connection.

Figure 4:
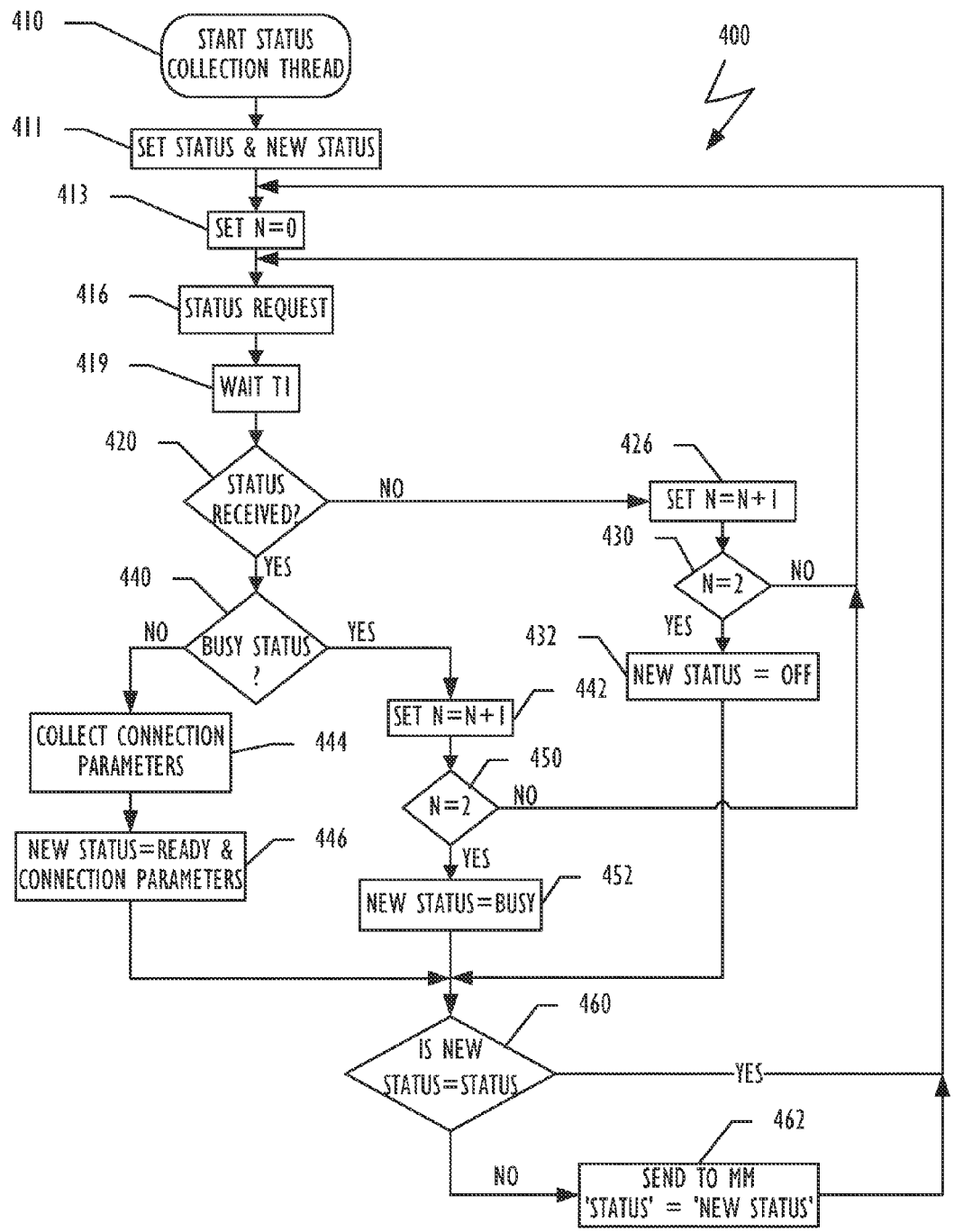
FIG. 4 illustrates a flowchart of an exemplary status collection routine that may be used by a client agent.

Following is a detailed description of a few exemplary methods that may be performed using the foregoing hardware and concepts. FIG. 4 illustrates a flowchart of an exemplary status collection task 400 that may be used by an exemplary client agent 205 to determine the status of a particular endpoint 156/166. Task 400 may start (410) when a PC 153/163 at and endpoint 156/166 is powered on, and preferably runs in the background without interfering with the user. Upon initiation 410, a status register and a new status register are set to zero (411). A counter 'N' is also set to zero (413) and a request is sent 416 via connection 154/164 to endpoints 156/166 (416). An exemplary request may be accomplished via any interface provided by the endpoints 156/166, such as Polycom's ViewStation product, and may be formatted in a TCP/IP protocol, although other communication links and protocols may be used such as those mentioned earlier.

After waiting for an appropriate period T1 for a response (419), for example from a few seconds to a few minutes, a decision is made whether a response from the endpoint has been received (420). If not, counter 'N' is increased 426 by one and a decision is made whether 'N' is two or not (430), although other exemplary embodiment may use a value different than two. If not, method 400 may return to step 416 and requests the status again. However, if N=2, then the client agent 205 assumes that the endpoint is off (432) and may set the new status register to indicate an "off" status before proceeding to step 460.

Returning to step 420, if a status from the endpoint 156/166 is received, a decision is made whether the status is busy (440). If so, then counter 'N' is increased by one (442) and a decision is made whether 'N' is two or not (450), where again two is merely an exemplary value. If not, method 400 may return to step 416 and requests the status again. If N=2, then the "new status" register may be set to "busy" (452) before proceeding to step 460.

If the received status 440 is not a "busy" status, then the client agent 205 preferably collects the connection parameters of the endpoint 156/166 (444) and sets the "new status" register to "ready" (446).

In step 460, a decision is made whether "new status" and "status" are the same. If so, then method 400 preferably returns to step 413 to start the process again. If they are not the same, the "new status" register is copied to the "status" register, which is in turn sent to MM 307 (462) and method 400 may return to step 413. Also, although not depicted, if the status is "ready," the connection parameters are also sent to MM 307 and method 400 may return to step 413. In an alternate exemplary embodiment also not depicted, if the status is "Off," a message may be sent to the user indicating that fact and recommending the user to turn it on. The status collection loop 400 may continue as long as PC 153/163 is on.

In another exemplary embodiment an endpoint 156/166 may automatically report its status upon change. In this case, method 400 would be modified accordingly.

Figure 5:
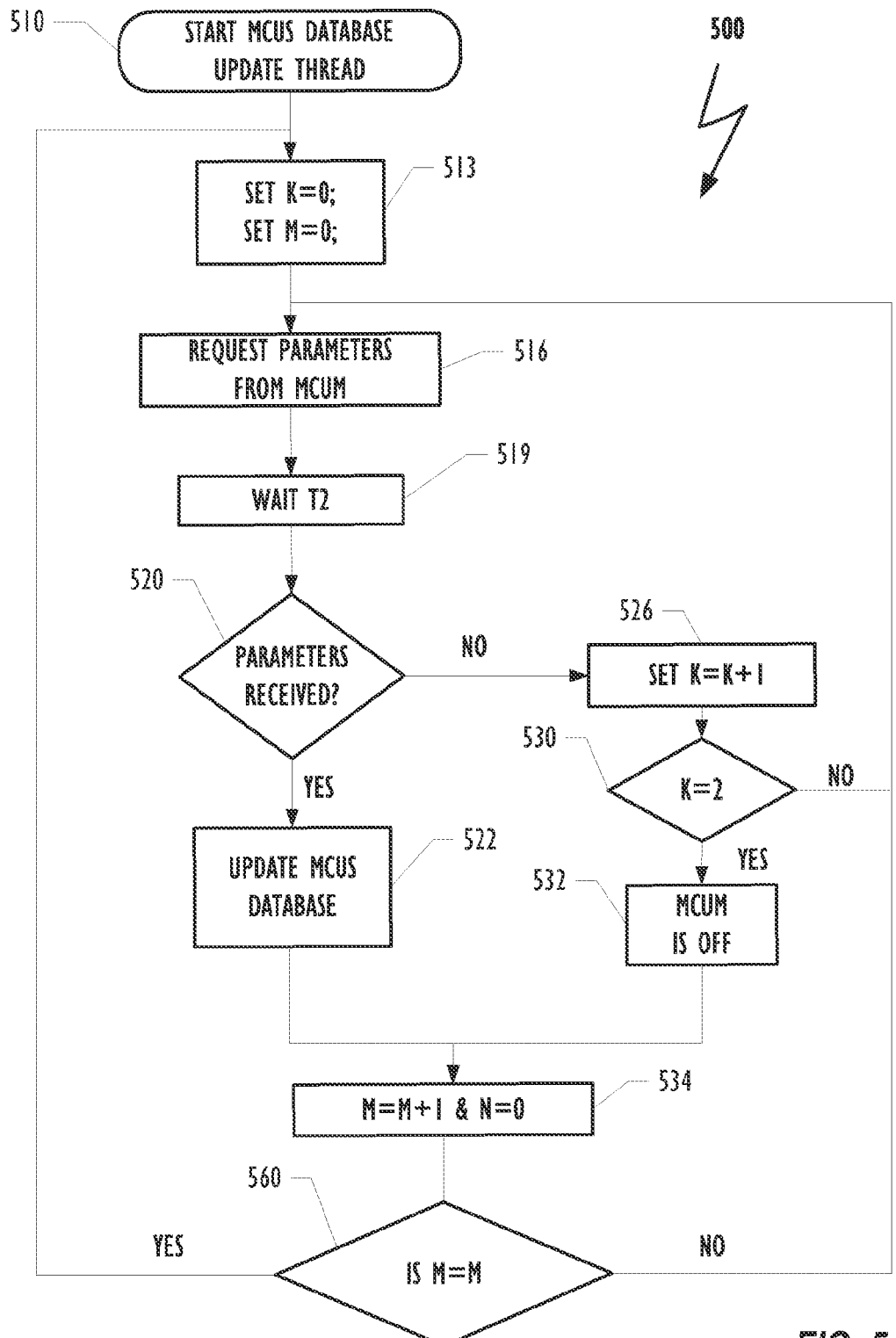
FIG. 5 illustrates a flowchart of an exemplary MCUs update task that may be used by an exemplary IP Server.

FIG. 5 illustrates a flowchart of an exemplary MCU update task 500 that may be used by an exemplary MCUM 330 in Managing Module (MM) 307 to determine available resources and connection parameters for MCUs 140a-c. Task 500 may start upon power on of IP Server 110a-c (510) and it may run in the background without interfering with the common operation of the server. Upon initiation, a counter 'K' and a counter 'm' are set to zero (513) and a request is sent via connection 124 (FIG. 1) to a first MCU (i.e., $MCU_m$) within the group of MCUs 140a-c (516). An exemplary request may be accomplished by querying $MCU_m$ via its interfaces as disclosed earlier. For example, a Polycom MGC MCU may be queried using XML API over TCP/IP.

Thereafter, the system waits for an appropriate period (T2), again from a few seconds to a few minutes, for the $MCU_m$ to respond concerning its availability and connection parameters (519). Such response by the $MCU_m$ can include reporting the number of free audio ports, video ports, data ports, free bridges, etc., and connection parameters such as the MCU's IP addresses, ISDN dialing numbers, etc.

After the period T2, a decision is made whether a response from $MCU_m$ has been received (520). If not, counter 'K' is increased by one (526) and a decision is made whether 'K' is two (an exemplary value) or not (530). If not, method 500 may return to step 516 and request the parameters again. If K=2, then an assumption is made 532 that the $MCU_m$ is off (532), at which point MCUM 330 updates $MCU_m$'s status as necessary before proceeding to step 534.

In an alternate embodiment not depicted in FIG. 5, before updating $MCU_m$'s status, MCUM 330 may check whether $MCU_m$ had controlled one or more multimedia sessions before this update. If so, MCUM 330 may start a task to find a substitute one or more MCUs 140a-c and to transfer the current or future sessions to the substitute MCU(s). The task of finding a substitute MCU may repeat a task of establishing a multimedia session for each one of the sessions that were controlled by $MCU_m$. The task of establishing a multimedia session is discussed in detail below with respect to FIG. 7. Such additional functionality improves the reliability and scalability of the multimedia communication system 100.

Returning now to step 520, if a response from the $MCU_m$ is received, then the MCUM 330 updates its information concerning available resources and connection parameters (522) for MCU$_m$, sets counter 'N' to zero, and increases counter 'm' by one (534) to indicate the next MCU in the group of MCUs 140a-c.

At step 560, a decision is made whether 'm' is equal to 'M', wherein 'M' is the number of MCUs in the group of MCUs 140a-c. The value of 'M' may be loaded to IP server 110 when it is established, and can be configured or changed from time to time as MCUs 140 are added or taken out of the system. If m=M, then method 500 preferably returns to step 513 to start monitoring the MCUs once again. If 'm' is not equal to 'M', then method 500 preferably returns to step 516 to process the next MCU (i.e., MCU$_{m+1}$) in the group.

In an alternative embodiment, a given MCU$_m$ may be configured to search for the IP server 110 and then to automatically send its resources and connection parameters when the MCU$_m$ is powered on.

Reference is now made to FIG. 6, which illustrates a flowchart of an exemplary user database update task 600 that may be used by an exemplary DBMM 340 in Managing Module (MM) 307 (FIG. 3). Task 600 preferably starts upon power on of IP Server 110a-c (610) and preferably runs in the background without interfering with the common operation of the IP server. After a waiting period of T3, which again might range from a few seconds to a few minutes (615), a decision is made whether a status update has been received from one or more client agents 205 (620). If not, method 600 may return to step 615 and wait again. If a status update has been received, DBMM 340 may update the status accordingly (622). The DBMM 340 may then return to step 615 to continue waiting for further user status updates.

Figure 7A:
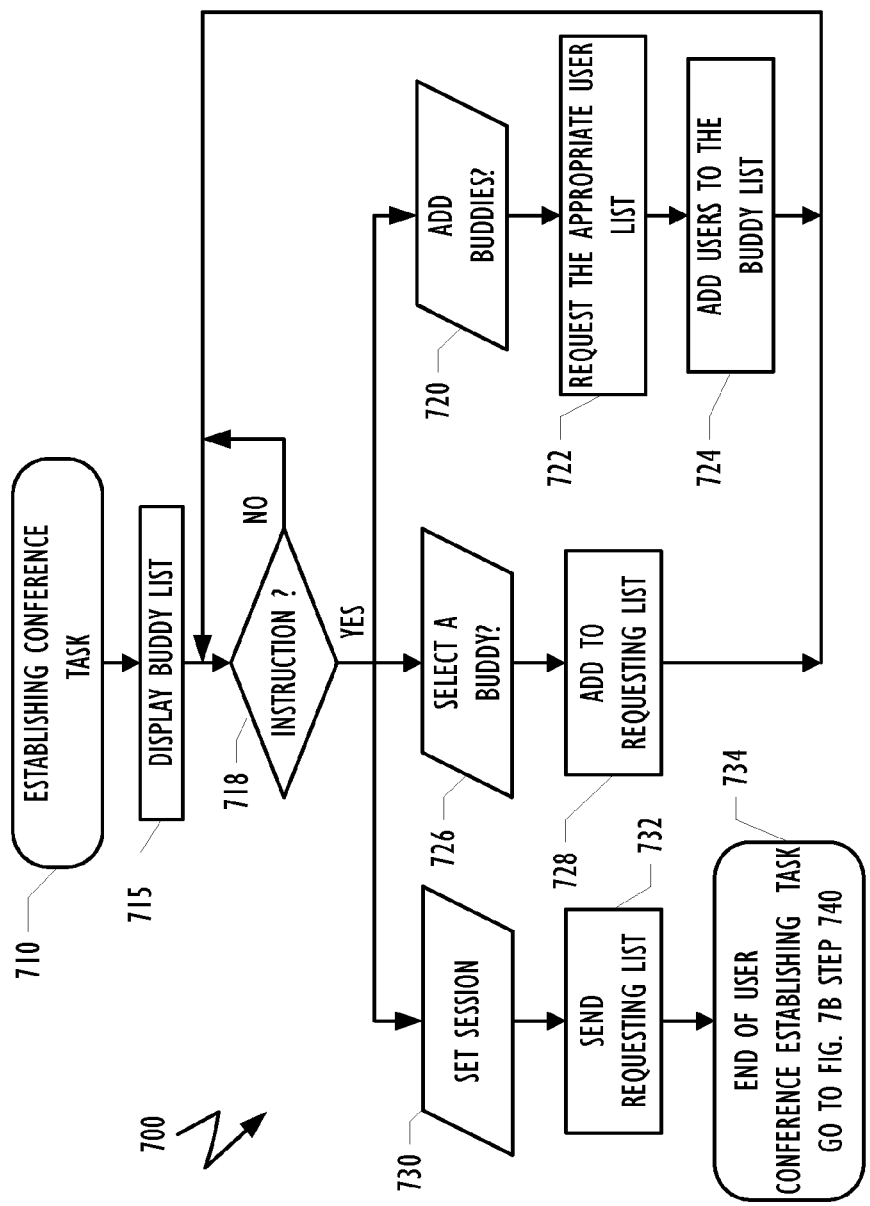
FIGS. 7a and 7b illustrate a flowchart of an exemplary method that may be used to establish a multimedia session.
Figure 7B:
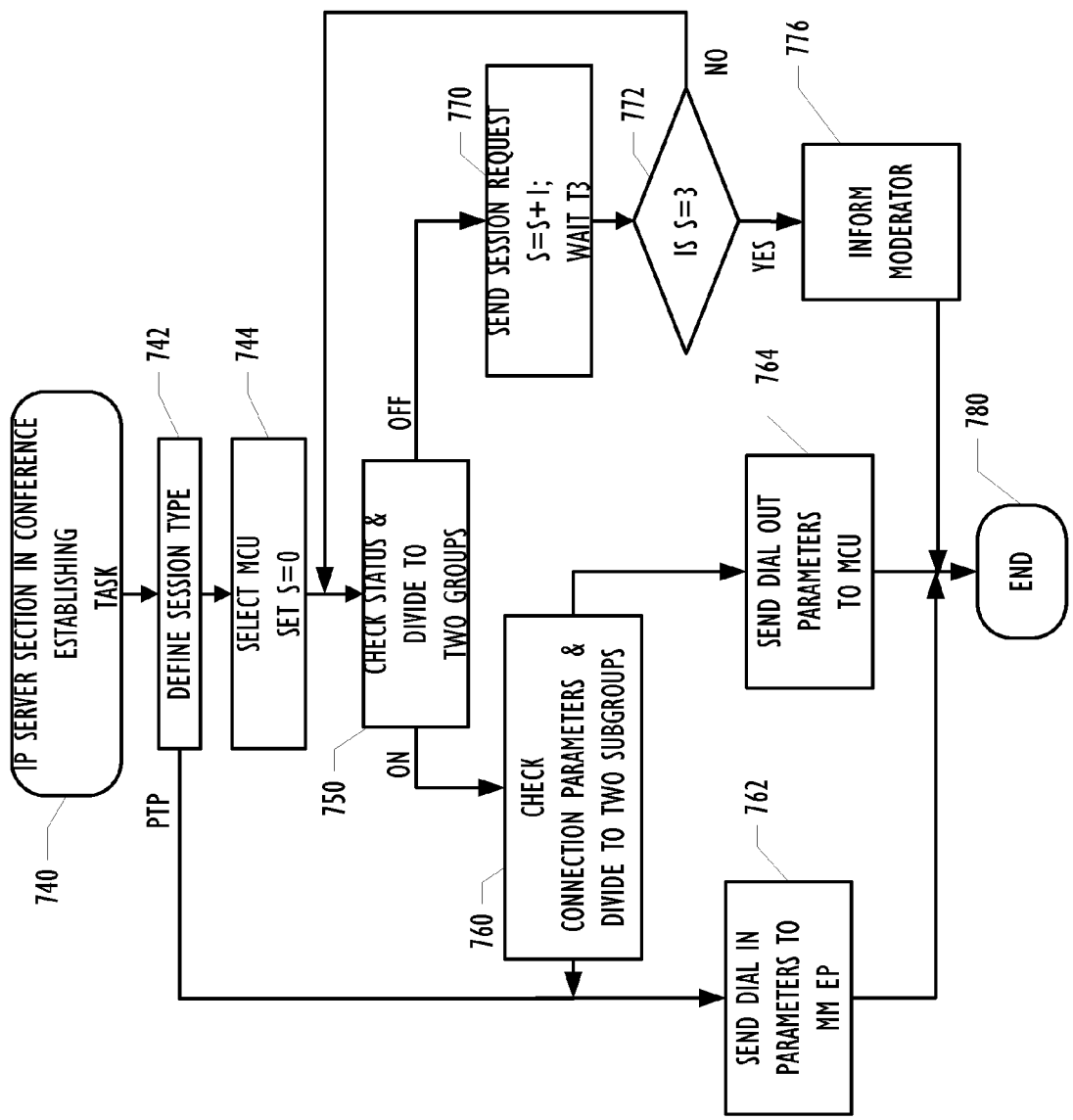

Reference is now made to FIGS. 7a and 7b, which illustrate flowcharts of an exemplary method 700 that may be used to establishing a multimedia session. The operation of method 700 may be distributed among several units of system 100 as noted earlier.

A user who wishes to establish a multimedia session (i.e., the moderator) requests display of the user's buddy list (715). In response, the moderator's buddy list is displayed and the system waits for an instruction from the moderator (718). Several types of instructions may be used. For example, the moderator may select a buddy from the list (726), and the selected buddy is then added to a requesting list (728), and as such, the requesting list may include the users that are requested by the moderator to be part of the session.

If the instruction is a request to add users to the moderator's buddy list (720), then the client agent 205 may request the IP server 110a-c to send an appropriate user list from the user's database 350a-c (722). The appropriate user's list may be defined by the moderator or may be automatically selected depending on the moderator's characteristic. The requested user's list is thereafter displayed and the moderator may then select and add one or more users to his buddy list (724).

If the instruction is to establish the session 730 with the users previously selected for inclusion on the requesting list (728), then the requesting list is sent to the IP server 110a-c via IP connection 125/126 (732), at which point, control over the multimedia session is transferred to the IP server, as discussed further with respect to FIG. 7b.

Upon receiving 740 the requesting list and the request to establish a multimedia session, the MM 307 at the appropriate IP server begins the process of establishing the multimedia session. Thus, at step 742, the MM 307 retrieves, from the appropriate user's database 350a-c, the connection parameters for the users that are include in the requesting list, as discussed earlier with respect to FIG. 4. Based on the retrieved connection parameters, the type of the multimedia session is defined, for example: whether the required session is point-to-point or multipoint in nature; whether the session is audio or multimedia in nature; whether layouts are required in a video session; whether transcoding is required because differing communication protocols or compression schemes are used at the endpoints; etc.

In case of a point-to-point session, an MCU may not be needed. In such a case, the MM 307 preferably sends the dialing number and/or the IP address of the moderator's endpoint to the client agent of the called user's endpoint (762), thereby instructing the called user's client agent to call the moderator's endpoint.

Based on the session definition, and assuming the resources of an MCU 140a-c are required, a decision is made regarding the resources that are needed (744), such as the number of audio ports, number of video ports, type and number of network interface cards, etc. Based on the needed resources and the MCUs database that is managed by MCUM 330 as determined with respect to FIG. 5, one of the MCUs 140a-c is selected to handle the session. In some cases, more than one MCU may be selected to handle the session, in which case the selected MCUs may operate in a cascading fashion. In case that there are no free resources to carry the session, a message is preferably sent to the moderator informing him that the request for multimedia session is denied.

The selection of the appropriate one or more MCUs may be based on different criteria, such as but not limited to available resources, cost parameters such as the distance of the MCUs from the users, network topology, etc. In any event, selection of the MCU(s) is accompanied by reset of a counter 's' to zero, which counter count the number of MCU selection retries.

After selecting the appropriate one or more MCUs, MM 307 may divide the users of the requesting list into two groups (750): a group of users whose endpoints are "off", for example, because the user is away or unavailable; and a group of users whose endpoints are "on" and accordingly are available.

Each group may be handled by separate tasks executed in parallel. The "off" group task starts at step 770, in which case an instant message is sent to each user to inform them of their off status and the fact that they are being requested to join the conference. Such a message is preferably sent via the client agent 205 that is installed in the user's PC 153/163. An exemplary instant message may inform the user that the moderator invites him to a multimedia session and requests the user to turn on his endpoint. Thereafter, the counter 's' is increased by one and the task may wait for a period T3 (770), possibly a few minutes or so. After time period T3, a decision is made whether 's' is three (772), although as before this number is merely exemplary. If not, method 700 preferably returns to step 750. During this cycle, only users that were in the "off" in the previous cycle are handled. If 's' is three 772, then a message is sent 776 to the moderator informing him that the appropriate user is unavailable and can not be connected to the session. Then the task is terminated 780.

The group of the users whose endpoints are "on" is handled by a task that starts at step 760. In step 760, the connection parameters of each "on" endpoint is checked to divide the group into two subgroups: a "dial out" group and a "dial in" group. As mentioned earlier, a "dial out" user is a user whose endpoint cannot be externally instructed to initiate a call, for example, a regular telephone, and accordingly the MCU must bear the burden of contacting such users. By contrast, a "dial in" user is a user whose endpoint has the capability to be externally controlled to initiate a call, for example, Polycom ViewStation.

The list of the "dial out" subgroup is sent to the selected MCU, along with a request to the MCU to call those users to add them to the session (764). Preferably in parallel, the "dial in" number, IP address, and/or URL of the selected MCU, along with a password if needed, are sent via the appropriate CIM 360a-c to the client agents 205 (762) for the "dial in" users, requesting the client agents to instruct the associated endpoints to "dial in" the number or address to set the session. In addition, the client agent may send a message to its user with the password of the session.

Other exemplary embodiments may add additional functionalities to the system. For example, an alternate embodiment of the present invention may give the moderator an option to add a new participant during an existing session. Such an embodiment may use a similar method to the example that is disclosed above with respect to FIGS. 7a and 7b with new starting conditions and some modifications. For example, the selection of an MCU (744) would start by checking if the MCU that is controlling the current session has enough resources and capabilities for the new participant (s). If so, the current MCU remains and the current conference is not disturbed. Step 750 may then be modified to handle only the additional participants. If the current session is a point-to-point, then adding a participant would require an MCU, which change can be made automatically, after checking for necessary resources, etc.

If the current MCU cannot support an additional participant, a message may be sent to the current participants informing them that their session is temporary terminated and it will be transferred to another MCU. Then method 700 may continue from step 744 with a broader-requesting list that includes the additional participants.

Other embodiments of the present invention may give the moderator an option to remove any of the participants, etc.

Other exemplary embodiment of the present invention may add additional tasks to increase the probability of establishing the requested multimedia session. For example, a retrial task may be initiated by the MM 307 after a certain period of time, for example a few minutes, after the termination of task 700. The retrial task may request from the selected MCU a list of the conferees in the relevant multimedia session. This list is compared with the requesting list and a new list of missing user is created, i.e., those users in the requesting list but not in the current conferees list. Thereafter, the retrial task at step 740 with new starting conditions, and wherein the requesting list constitutes the missing list. The connection parameters of the missing users may be set to be different than the connection parameters that were used in the previous cycle. For example, if during the first time the endpoint of a missing user was defined as an IP-based endpoint, then during the current try the endpoint may be defined as an ISDN-based endpoint. This assumes that the missing endpoint may be connected over two or more networks using different communication protocols, for example, over an IP network using H.323 protocol and over ISDN network using H.320 protocol.

In further alternate embodiments, rather than informing the moderator that a particular user cannot participate in the session (776), the moderator may be transferred to a multimedia answering system (MAS). The MAS can be a storage device that is associated with the IP server 110a-c, or may constitute a separate server connected over the network. Each user of the system may have a "mailbox" in the MAS as well as a welcome message informing a caller to leave a message, which can be a vocal message, a video message, a text message, or a combination of these. In such an embodiment, the buddy list resident on the moderator's endpoint can include a field to indicate the address of the section in the MAS for each of the buddies, including those users which can't presently participate. Transferring the moderator to the unavailable user's mailbox in the MAS can be accomplished for a point-to-point session by informing the moderator's endpoint to call the relevant MAS address in a manner similar to the "dial in" step 762 discussed above. In the case of a multipoint session, the MCU may be informed to call the MAS and to connect it to the moderator in a manner similar to the "dial out" step 764 discussed above. At the end of recording the moderator's message, the MAS may send an indication to the unavailable user that a multimedia message is received and stored in the MAS, which may be sent via SMS, instant message, e-mail, or which may be sent to the endpoint. If received with sufficient time, the unavailable user can perhaps join the conference at a later time.

It should be appreciated from the foregoing that the disclosed systems and methods reduce the complication of establishing a multimedia session and reduces the barriers that prevent users from enjoying the advantages of multimedia conferencing. The disclosed systems and methods additionally increase the probability for successfully establishing am impromptu multimedia session.

The present invention has been described using detailed descriptions of embodiments thereof that are provided by way of example and which are not intended to limit the scope of the invention. Moreover, not all features of the described embodiments are required in all embodiments of the invention, as some embodiments may only utilize some of the disclosed features or possible combinations of the features. Additionally, variations of the disclosed embodiments and differing combinations of the disclosed features and other features will occur to persons of the art. The scope of the invention is limited only by the following claims.

What is claimed is:

1. A method for leaving a message for a user in a multimedia session environment, comprising:
    receiving at a server from a first endpoint a requested list of at least one second endpoint desired to participate in the multimedia session;
    determining a status of the at least one second endpoint at the server; and
    transmitting from the server a message to a user at the at least one second endpoint, responsive to determining that the status of the at least one second endpoint is such that the at least one second endpoint is unavailable to participate in the multimedia session,
    wherein the message invites the user to the multimedia session,
    wherein determining the status and transmitting the message are performed a predetermined number of times before indicating the at least one second endpoint is unavailable to participate in the multimedia session with the first endpoint; and
    wherein determining the status of the at least one second endpoint at the server comprises checking a database at the server.

2. The method of claim 1, wherein the message is transmitted to the at least one second endpoint upon receiving a request from the at least one second endpoint.

3. The method of claim 1, wherein the server is an IP server.

4. The method of claim 1, wherein the first endpoint and the at least one second endpoint each are associated with a computer, and wherein the server communicates with the first endpoint and the at least one second endpoint via their associated computer.

5. The method of claim 1, wherein the server is integrated with at least one computer.

6. The method of claim 1, further comprising at least one network for carrying communications between the server and the first endpoint and the at least one second endpoint.

7. The method of claim 6, wherein the at least one network comprises an IP network.

8. The method of claim 1, wherein the server is integrated with at least one of the first endpoint and the at least one second endpoint.

9. The method of claim 1, wherein the server comprises at least one buddy list, wherein each buddy in the buddy list is associated with an endpoint, and wherein the requested list is generated via access to the buddy list.

10. The method of claim 9, wherein the buddy list comprises information concerning the status of the endpoints for each buddy in the buddy list.

11. The method of claim 1, further comprising sending from the server a message to a user at the first endpoint that at least one second endpoint is unavailable, and permitting the user at the first endpoint to compose a message to the user at the at least one second endpoint.

12. The method of claim 1, wherein determining the status of the at least one second endpoint at the server occurs continuously.

13. The method of claim 1, wherein determining the status of the at least one second endpoint at the server comprises determining whether the at least one second endpoint is on.

14. The method of claim 1, wherein the message inviting the user to the multimedia session requests the user to turn on the at least one second endpoint.

15. The method of claim 1, further comprising:
 waiting for a predetermined period after sending the message inviting the user to the multimedia session.

* * * * *